June 11, 1935.  A. STEINLE  2,004,225
INSTRUMENT FOR TESTING THE PITCH OF THREADS
Filed Aug. 1, 1930
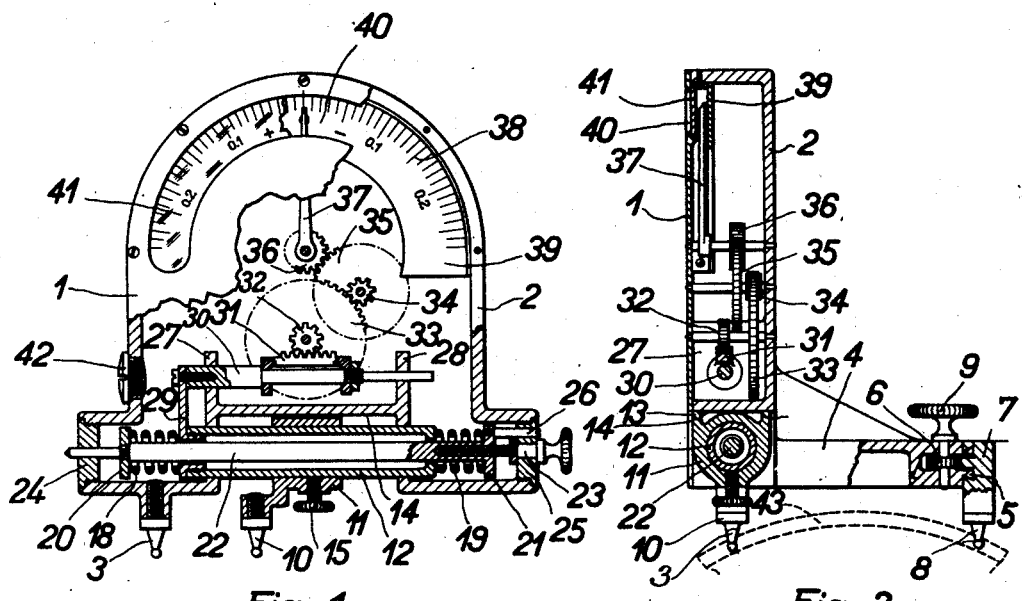
Fig. 1
Fig. 3
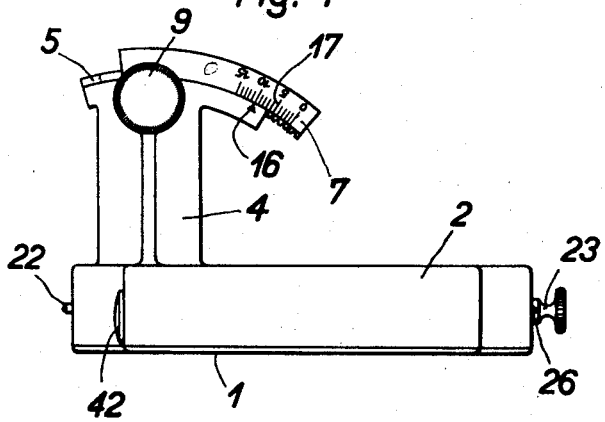
Fig. 2
Inventor:
Adolf Steinle Patented June 11, 1935

2,004,225

UNITED STATES PATENT OFFICE 2,004,225

INSTRUMENT FOR TESTING THE PITCH OF THREADS

Adolf Steinle, Jena, Germany, assignor to firm Carl Zeiss, Jena, Germany

Application August 1, 1930, Serial No. 472,450
In Germany August 10, 1929

5 Claims. (Cl. 33—199)

I have filed an application in Germany, August 10, 1929.

The pitch of threads is tested by means of the well-known devices which generally render it necessary to proceed from the assumption that the exterior, or bottom, diameter of the thread to be tested is free from faults. However, also this diameter may not be correct and thus lead to wrong testing results. To avoid this disadvantage, the new testing instrument conveniently has three feelers whose ends respresent the corner points of a triangle and of which one can be rotated about an axis at right angles to the line connecting the two other points. When using the instrument, the operator avails himself only of really operative parts of the thread, that is to say of the flanks. Two of the said points must be so introduced into one winding of the thread that their connecting line and a plane at right angles to the thread axis enclose the pitch angle, and that the line connecting one of these two points with the third one is parallel to the thread axis.

To allow the size of the pitch angle to be adjusted to suit the thread to be tested, the instrument is conveniently provided with a device indicating the angle of rotation. For testing a great quantity of work pieces having the same threads, a kind of gauge may serve whose angle of rotation is fixed at a certain pitch value in such a manner as to no longer permit of rotating the rotatable feeler.

The feelers to be placed in the windings of the threads are conveniently provided with spherical ends. The centres of these spherical ends, which, in the case of threads with triangular cross section, always lie on the bisecting line of the angle formed by two intersecting flank profiles, form the real measuring points, viz. the corner points of the triangle determined by the feelers. The pitch of the thread is that distance apart of two windings which is parallel to the thread axis. To measure this pitch by means of the instrument described above, the distance apart of those two feelers whose connecting line is parallel to the thread axis is to be changeable, the purpose of this change being to make the said distance equal to the pitch or to an entire multiple of this pitch. From the length of this distance the value of the pitch of the tested thread can be determined at once.

Of the accompanying drawing, which represents an example of an embodiment of the invention, Fig. 1 shows the instrument in a front elevation, partly in a section, Fig. 2 in a plan view, and Fig. 3 in a cross section in elevation.

The example represented by the drawing has a casing 2 which is closed by a cover 1. To the casing 2 is attached a fixed feeler 3 and to a lateral arm 4 a feeler 8. By means of a pinion 6 and a slide provided with a curved rack, 7, this feeler 8 is made movable in a curved guide 5 and rotatable about the axis of the feeler 3, which is perpendicular to the triangle side 3, 8. For moving the pinion 6 a milled head 9 is provided. A third feeler 10 is fixedly connected with a sleeve 11 which is displaceable along a tubular piece 12, whereby two guide rods 13 provided on the sleeve 11 slide one a guide surface 14 belonging to the casing 2. A clamping screw 15 serves for holding the sleeve 11 on the tubular piece 12. The three feelers 3, 8, and 10 have spherical ends whose centres represent the corner points of a triangle. The lateral arm 4 has an index 16 belonging to an angular graduation 17 provided on the slide 7. This graduation 17 is so provided on the slide 7 that the angle enclosed by the triangle sides 8, 3, and 10, 3 is 90° as soon as the line zero coincides with the index 16. The tubular piece 12 can be displaced along its axis in the casing 2 and both its ends are under the stress of pressure springs 18 and 19. The pressure of these springs can be regulated by means of a bolt 22 which carries two spring rests 20, 21 and is adjustable in its axial direction by a screw 23. The bolt 22 goes through end pieces 24, 25 screwed into the casing 2, whereby a bolt 26 serves for preventing the bolt 22 from rotating about its axis. Two supports 27, 28 fixed to the casing 2 hold a bolt 30 which is connected with the tube 12 by means of a bridge 29 and carries a rack 31. This rack 31 meshes with a pinion 32 which, through the agency of toothed wheels 33, 34, 35, and 36, transmits its movements to an index 37. The toothed wheels 32 to 36 as well as the index 37 are rotatably mounted in the casing 2 and the cover 1. To the index 37 belongs a scale 38 provided on a dial 39 which is screwed to the casing 2. The cover 1 has an aperture 40 that corresponds to the scale 38 and is covered by a protecting glass 41. For introducing the bolt 30 into the casing 2 serves a hole which is closed by means of a screw 42.

When using the instrument the milled head 9 must be turned so as to adjust on the scale 17 the pitch angle of a thread to be tested, 43, by means of the index 16. Thereupon, the sleeve 11 is displaced and clamped tight on the tubular piece 12 in such a way that the distance from the feeler 3 to the feeler 10 corresponds to the sum of the pitch distances of a certain number of thread windings, whereby this distance may be regulated by the aid of a gauge or the like and, if so required, the screw 23 must be rotated at the same time in order to make the index 37 indicate the point zero when the feelers 3 and 10 have taken the said positions. As soon as the instrument has been thus adjusted for the test, its three feelers 3, 8, and 10 must be so introduced into the thread to be tested, 43, that the two feelers 3 and 8 go into the same winding of the thread and the line connecting the feelers 3 and 10 is parallel to the thread axis. In case the pitch of the thread to be tested, 43, deviates from the required value, which was previously adjusted on the instrument by means of a gauge, the feeler 10 and the tubular piece 12 are displaced against the pressure of one of the springs 18, 19 and the value of this deviation is transmitted by the movement of the tubular piece 12 to the bolt 30 and the rack 31, it is greatly enlarged by the toothed wheels 32 to 36, and finally, indicated by the index 37 on the correspondingly graduated scale 38.

I claim:

1. An instrument for testing the pitch of threads, comprising a casing, a feeler rigidly connected to the casing, a second feeler connected to and movable relatively to the casing, and a third feeler adjustably connected to the casing and being outside the line connecting the two other feelers, the said second feeler being rotatable about an axis at right angles to a plane determined by the said three feelers.

2. An instrument for testing the pitch of threads, comprising a casing, a feeler rigidly connected to the casing, a second feeler connected to and movable relatively to the casing, a third feeler adjustably connected to the casing and being outside the line connecting the two other feelers, the said second feeler being rotatable about an axis at right angles to a plane determined by the said three feelers, a member rigidly connected to the casing, a scale provided on the said member, and an index movably connected to the casing and coupled to the third feeler, the said scale and the said index coacting with each other and adapted to indicate the movements of the third feeler relative to the casing.

3. In an instrument according to claim 1 the axis of rotation of the second feeler traversing the said first feeler.

4. In an instrument according to claim 1 the axis of rotation of the second feeler traversing the said first feeler, and the said third feeler being movable relatively to the casing with respect to its distance from the said axis.

5. An instrument for testing the pitch of threads, comprising a casing, a feeler rigidly connected to the casing, a second feeler connected to and movable relatively to the casing, and a third feeler which is adjustably connected to the casing and lies outside the line connecting the two other feelers, the said second feeler being rotatable about an axis which is at right angles to the said connecting line and traverses the said first feeler, the said third feeler being movable relatively to the casing with respect to its distance from the said axis, a member rigidly connected to the casing, a scale provided on the said member, an index movably connected to the casing, the said scale and the said index coacting with each other and adapted to indicate the distance of the said third feeler from the said axis, and means connecting the said third feeler to the index.

ADOLF STEINLE.